United States Patent [19]

Grosse-Wilde et al.

[11] Patent Number: 5,644,283

[45] Date of Patent: Jul. 1, 1997

[54] VARIABLE HIGH-CURRENT RESISTOR, ESPECIALLY FOR USE AS PROTECTIVE ELEMENT IN POWER SWITCHING APPLICATIONS & CIRCUIT MAKING USE OF HIGH-CURRENT RESISTOR

[75] Inventors: Hubert Grosse-Wilde, Neunkirchen; Jörg Kieser, Forchheim; Wilfried Jaehner, Nürnberg; Fritz Pohl, Hemhofen; Reinhard Steger, Sulzbach-Rosenberg; Gert Vogel, Amberg, all of Germany

[73] Assignee: Siemens Aktiengesellschaft, Munich, Germany

[21] Appl. No.: 381,927

[22] PCT Filed: Aug. 11, 1993

[86] PCT No.: PCT/DE93/00721

§ 371 Date: Feb. 14, 1995

§ 102(e) Date: Feb. 14, 1995

[87] PCT Pub. No.: WO94/06130

PCT Pub. Date: Mar. 17, 1994

[30] Foreign Application Priority Data

Aug. 26, 1992 [DE] Germany ............ 42 28 297.7

[51] Int. Cl.$^6$ .................................................. H01C 7/10
[52] U.S. Cl. ........................... 338/20; 338/21; 338/47
[58] Field of Search ........................... 338/20, 21, 22 R, 338/47, 12

[56] References Cited

U.S. PATENT DOCUMENTS

| | | | |
|---|---|---|---|
| 2,951,817 | 9/1960 | Myers | 338/47 |
| 3,138,686 | 6/1964 | Mitoff et al. | 337/416 |
| 3,243,753 | 3/1966 | Kohler | 338/31 |
| 3,386,067 | 5/1968 | Costanzo | 338/100 |
| 3,626,348 | 12/1971 | Alten | 338/20 |
| 3,806,471 | 4/1974 | Mitchell | 338/99 |
| 4,101,862 | 7/1978 | Takagi et al. | 338/23 |
| 4,639,818 | 1/1987 | Cherian | 361/106 |
| 4,685,025 | 8/1987 | Carlomagno | 361/106 |
| 4,745,301 | 5/1988 | Michalchik | 307/119 |
| 4,890,186 | 12/1989 | Matsubara et al. | 361/103 |
| 5,144,274 | 9/1992 | Masaki | 338/12 |
| 5,247,276 | 9/1993 | Yamazaki | 338/22 R |
| 5,382,938 | 1/1995 | Hansson et al. | 338/22 R |

FOREIGN PATENT DOCUMENTS

| | | |
|---|---|---|
| 0487920 | 6/1992 | European Pat. Off. . |
| 0272807 | 4/1913 | Germany . |
| 90/00825 | 1/1990 | WIPO . |
| 91/12643 | 8/1991 | WIPO . |

OTHER PUBLICATIONS

Elektrotechnische Zeitschrift (A), No. 7, 1 Apr. 1952, Berlin, DE, pp. 199–200; Kleinsteuber: *Der Kohledruckspannungs–oder stromregler.*

Translation of German Patent No. 272807, R. Bosch, Apr. 1919.

*Primary Examiner*—Teresa J. Walberg
*Assistant Examiner*—Karl Easthom
*Attorney, Agent, or Firm*—Kenyon & Kenyon

[57] ABSTRACT

A variable high-current resistor, especially for use as a protective element in power switching technology has already been proposed, which contains carbon as a resistance material, at least one boundary layer with a transition zone to another electric conductor being provided. By applying a contact pressure, the resistance in the transition zone can be kept low. Under the prior art, the resistance is converted into a highly resistive state by means of Joulean heat. In accordance with the invention, the contact pressure of the variable high-current resistor is able to be selectively influenced, the carbon- and/or carbon-black-containing layer being pressed by the surface pressure with a preset first value against the other conductor to adjust the low-resistance state of the resistor, and that, in the event of a short-circuit, this contact pressure being able to be reduced in a short enough time to a second value, at which the resistance in the transition zone goes up by at least two orders of magnitude. High-current resistors of this type are able to be used in conjunction with circuit-breakers, power semiconductors, contactors and vacuum contactors.

30 Claims, 4 Drawing Sheets

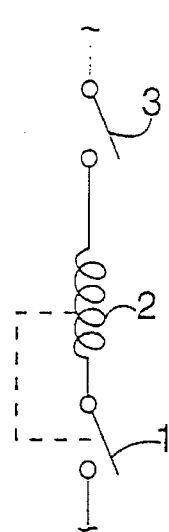
FIG. 1a
(PRIOR ART)
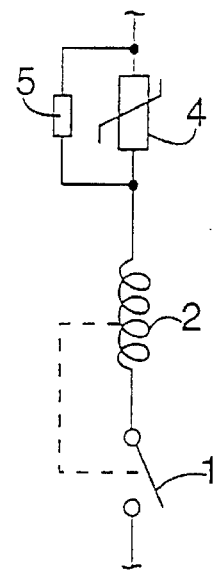
FIG. 1b
(PRIOR ART)
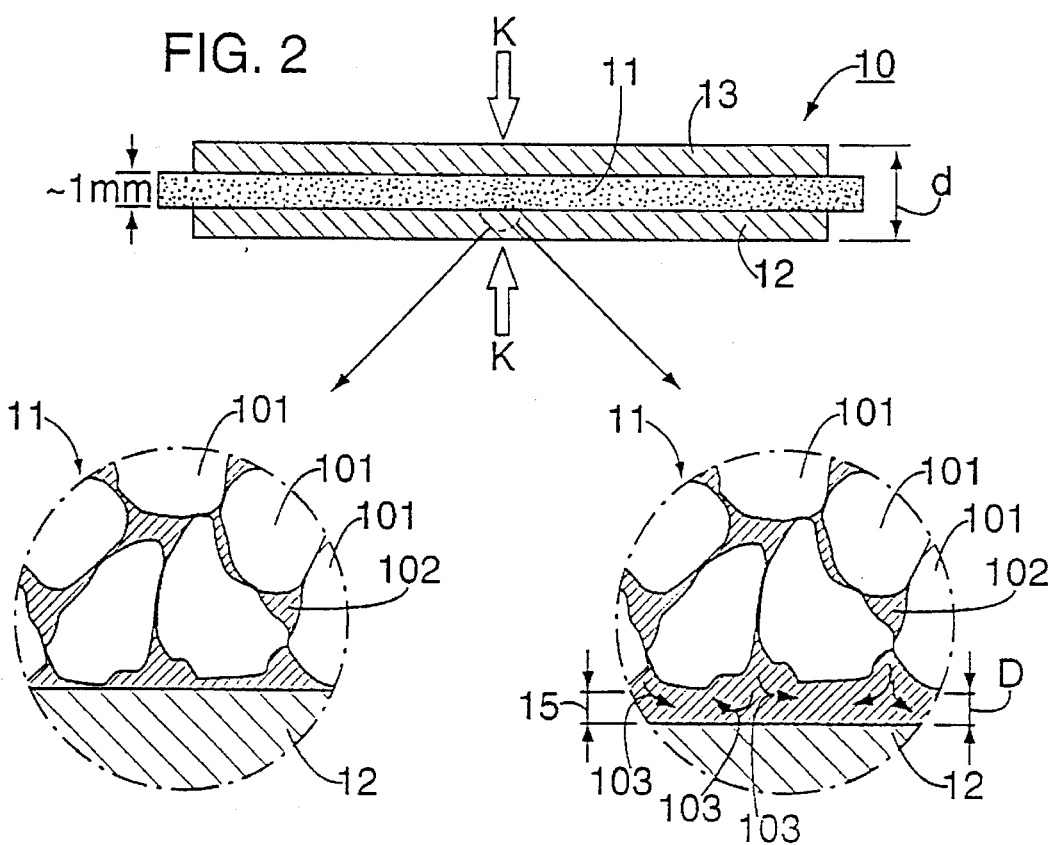
FIG. 2
FIG. 2a
FIG. 2b

VARIABLE HIGH-CURRENT RESISTOR, ESPECIALLY FOR USE AS PROTECTIVE ELEMENT IN POWER SWITCHING APPLICATIONS & CIRCUIT MAKING USE OF HIGH-CURRENT RESISTOR

BACKGROUND OF THE INVENTION

The present invention relates generally to variable high-current resistors, and more particularly to a variable high-current resistor for use as a protective element in power switching applications, in which carbon is used as a resistance material. Moreover, the present invention relates to circuit arrangements making use of this high-current resistor. In the case of such circuit arrangements, a circuit-breaker, a power semiconductor, a contactor or a vacuum contactor can be preferably provided as the circuit element.

In electrical low-voltage distribution systems, circuit-breakers must be able to interrupt the expected maximum short-circuit current in the event of a short-circuit. In the proximity of bus bars, this current can amount to 50 kA or even 100 kA. Circuit-breakers having this interrupting capacity must open the contacts within a period of time that is short relative to the duration of a system power-supply period and build up a high arc voltage in order to adequately limit the short-circuit current.

The latter circuit-breakers are complex in design and, accordingly, expensive. To be able to use simpler circuit-breakers having a smaller breaking capacity in the case of large, prospective short-circuit currents, equipment or devices are required to aid the circuit-breaker in limiting and interrupting the current in the event of a short-circuit.

Known methods heretofore have used so-called current limiters, which are connected in series to the circuit-breaker, as shown, e.g., in FIG 1a. "Limiters" are generally understood to be switching devices that do not have a breaker mechanism, so that in the event of a short-circuit, the contacts are opened by the current forces: the resulting arc voltage helps the circuit-breaker to limit and interrupt the current flowing in the shorted circuit.

Another possibility for limiting current consists in connecting a resistor in series with the circuit-breaker, which resistor in the case of nominal current or permissible overload current has a very low value and becomes highly resistive when a certain current threshold is exceeded within a short time. Thus, an additional resistor is provided in the shorted circuit which limits the current to harmless values. Resistors having the above described characteristic are described as PTC resistors (Positive Temperature Coefficient) or thermistors. A circuit arrangement that makes use of a resistor of this type for low-voltage applications has been proposed by the WO-A-91/12643. The variable high-current resistor it describes consists essentially of a carbon-black-filled polyethylene layer with a PTC effect. The same had essentially already been proposed by the WO-A-90/00825 for protective devices used for low voltages.

Moreover, the EP-A-0 487 920 describes in detail a PTC element having at least one resistor core of an electrically conductive polymer composition with a positive temperature coefficient, in the case of which each resistor core has two, preferably parallel surfaces, at least one boundary layer being connected to electrodes to introduce the current into the PTC element. To guarantee the PTC effect in the case of this high-current resistor that is usable as a protective element, the polymer resistor core is joined by its base areas to an electrode, at least one surface forming a so-called free contact with the associated electrode, and one pressure device being present, which exerts a pressure in a perpendicular direction on the electrodes and the base areas of the resistor core of the conductive polymer layer. The contact is altered as the result of electrodynamic repulsion at high currents, a simultaneous increase in temperature supposedly forming a fluid phase in the polymer material.

In addition, the DE-A-0 272 807 discloses a regulating resistor, in the case of which changes in resistance are produced by changes in the pressure of an electromagnetic armature on a granular mass containing, in particular, carbon powder. Finally, a carbon pressure regulator is also known from the ETZ (A) 73, 199 (52), which in response to a pressure-dependent change in the contact resistance rests on columnar laminae or rings. This carbon pressure regulator is used to regulate a voltage or a current, in that, given a rising value of the controlled variable, an electromagnet is controlled to produce a rising magnetic force to counteract the prestressing of a column of carbon laminae. Supposedly, variations in resistance by the factor 300 are possible.

In contrast, the present invention is directed to the problem of developing a high-current resistor of the type mentioned at the outset, so that it can be used as a limiter with the level of security required of protection devices. The requisite circuit arrangements shall also be indicated.

SUMMARY OF THE INVENTION

The present invention solves this problem by the totality of the following features:

— at least one boundary surface of a carbon- and/or carbon-black-containing layer having a transition zone to another electrical conductor, in particular an electrode, is provided, which receives a contact pressure;

— the contact pressure is able to be selectively influenced;

— the carbon- and/or carbon-black-containing layer is pressed by the surface pressure with a preset first value against the other electrical conductor, in particular the electrode, to adjust the low-resistance state of the resistor;

— in the event of a short-circuit, the contact pressure is able to be reduced in a short enough time to a second value, at which the resistance in the transition zone goes up by a least two orders of magnitude;

— given a sufficiently large current, the force is reduced as the result of pressure developed between the carbon- and/or carbon-black-containing layer and the other conductor, in particular the electrode;

— the pressure reducing force develops primarily as the result of thermal decomposition of the binding agent into gaseous decomposition products, in that the temperature of the binding agent in the transition zone of the carbon- and/or carbon-black-containing layer to the other electrical conductor, in particular to the adjacent electrode, is increased by the electric power loss up to the decomposition temperature.

Additional means for reducing the force in conformance with the flowing current are advantageously provided. In particular for protective element designs, in the event of a short-circuit when a specifiable current threshold is exceeded, e.g. 15-times $I_{nominal}$, the resistance in the transition zone can rise, for instance, 100 times and, thus, reliably limit the short-circuit current to harmless values within a period of time that is short relative to the system power-supply period.

Within the scope of the invention, "resistance" is understood to be the quotient from the voltage drop across the high-current resistor and the current through the resistor. The voltage drop that is effective to the outside results from the current distribution in the resistor core extended on a plane and from the series connections of voltage drops on a microscopic level. In the case of the high-current resistor according to the invention, these voltage drops can occur in the carbon-black and/or carbon particles or at the contact zones of adjoining particles. It is equally possible for there to be electric gas discharges between conductive particles, particularly in the transition zone.

By selectively influencing the contact pressure and its reduction in accordance with the present invention, one attains advantages, in particular in comparison with the PTC element according to the EP-A-O 487 920. The polymer material used therein that is made conductive becomes highly resistive above a certain temperature, which for polyethylene is at about 120° C., the known elements being heated by the short-circuit current and, in particular, the flat point of contact between a metallic electrode and the conductive polyethylene member contributing to the rise in temperature in the surface area of the polyethylene. Therefore, under the state of the art, the thermistor effect must be adjusted in order for the rise in resistance in a thin polyethylene layer to effect the current limitation.

In contrast, the present invention takes advantage of the fact that the electrical resistance at a mechanically releasable contact point is dependent upon the contact force and, in fact, in the manner that the resistance increases definably with decreasing contact force. The current density can advantageously be kept low at the releasable contact point, so that destruction to the electrode surfaces caused by high power densities is avoided. It proves to be advantageous in this case to use carbon-black or carbon layers at least on one side of the releasable contact point, because the force-dependent change in resistance is large for these materials. It is especially advantageous to use a finely powdered carbon-black or carbon layer as a contact layer. This layer can be the result, for example, of earlier mechanical or thermal stresses.

In contrast to the EP-A-O 487 920, in which exclusively the PTC effect is utilized, in the case of the present invention, those layers can also be used which do not demonstrate a thermistor effect. In particular, however, annealed sintered bodies of these materials or compacts with added synthetic resin as binding agent can be used. To obtain a substantially uniform current distribution in the releasable contact surface, the resistance of these bodies should not be too low. The resistance can be influenced, however, by the composition of the sintered bodies or compacts. Favorable resistance values lie between 0.1 $\Omega$.cm and 1 $\Omega$.cm.

A functional protective element is created with the present invention which can be connected in series, in the manner of a thermistor, with a circuit-breaker in the electric circuit of a low-voltage distribution system. Applications in conjunction with power semiconductors, contactors or vacuum contactors are also possible.

It can be achieved with the high-current resistor according to the present invention that for currents less than 12 to $15 \times I_{nominal}$, the resistance of the protective element is so small that the power loss in the element at $I_{nominal}$ amounts at the most to a few watts per conducting path: for example, for $I_{nominal} = 20$ A, the resistance can amount to 2 milliohm, so that the power loss at 20 A amounts to more or less 800 mW. If the current rises above $15 \times I_{nominal}$, then the resistance increases 100 times or more: in this manner, the short-circuit current is limited to harmless values. If there is inductance in the circuit, which is generally the case in low-voltage power-supply systems, the current can then be commutated to a parallel sub-circuit, to ensure that the high-current resistor according to the present invention is not damaged by high power losses. Practical in this case for the parallel sub-circuit are a constant resistance or a voltage-dependent resistance.

Taking advantage of a generally known effect, the protective element has at least one contact surface of a metallic electrode and of a carbon-black or carbon-containing electrically conductive layer, or at least one contact surface of two carbon-black and/or carbon-containing layers. The current flows through this contact surface. At rated current or permissible overload current, the metallic electrode and the carbon-black- and/or carbon-containing layers are compressed with a force that makes the contact resistance small enough. In the event of a short-circuit when a current threshold is exceeded, this force is reduced by pressure development between the electrode and the carbon-black- and/or carbon-containing layers within a period of time that is short relative to the duration of a system power-supply period, until the resistance in the boundary layer of the contact surface rises to the extent desired.

As in the case of the column resistor, a plurality of the above described boundary layers can also be connected in series in the case of the high-current resistor according to the invention. The carbon-black- and/or carbon-containing layers are preferably round or rectangular lamellae, in the case of which the carbon-black or carbon particles are held together by binding agents.

The latter binding agents define, at the same time, the means for reducing the contact pressure and are to be selected, accordingly. The other means for reducing the contact pressure can be based either on the electromagnetic principle or, however, in the utilization of piezoelectric actuating elements. In the latter cases, in particular, the contact pressure can be selectively reduced by the externally controllable force.

BRIEF DESCRIPTION OF THE DRAWINGS

FIG 1a and 1b depict two circuit arrangements under the state of the art.

FIG. 2 depicts in cross-section, a high-current resistor having first means for generating pressure for the purpose of reducing force, with two functional details.

DETAILED DESCRIPTION

Figure 3:
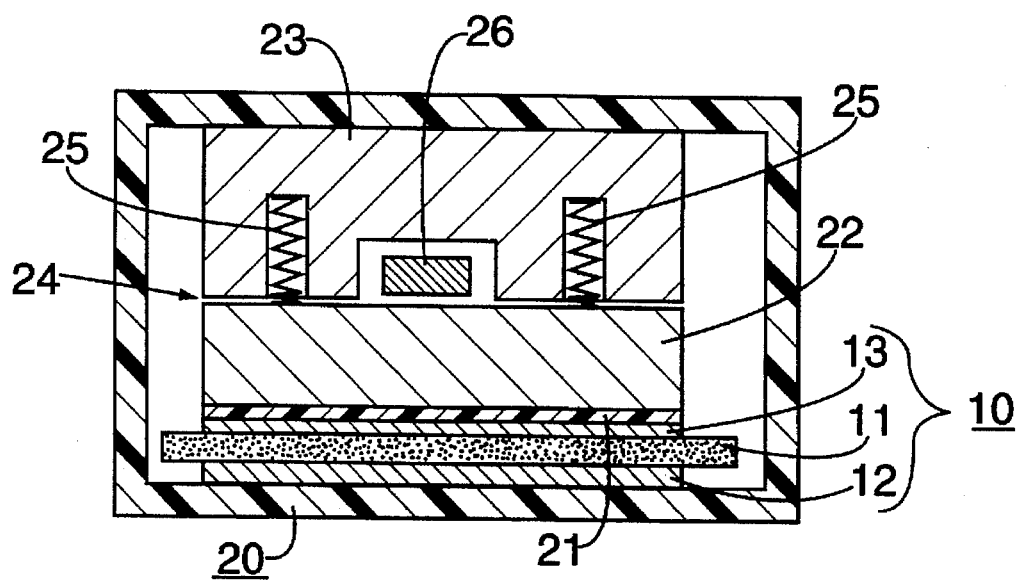
FIG. 3 depicts an electromagnetically controlled arrangement as a second means for reducing force.

In FIGS. 1a and 1b, 1 denotes a circuit-breaker and 2 a solenoid coil of the trip element of the circuit-breaker 1. In FIG 1a, connected in series to this arrangement is a so-called arc limiter 3, in the case of which, for example, in the event of a short-circuit, the contacts open as a result of the current forces. Alternatively to this, in FIG 1b, connected in series to the circuit-breaker 1 with the solenoid coil 2 is a thermistor 4, to which a resistor 5 is connected in parallel. In the cold state, the thermistor has a small electrical resistance and, in the hot state, a high electrical resistance (so-called PTC effect). The thermistor is heated by the flowing current itself, it becoming highly resistive after exceeding a certain temperature. The parallel resistor 5 is provided for unloading the thermistor and for limiting the short-circuit current.

Customary thermistors or PTC resistors are only suitable for use as current limiters for comparatively low voltages and currents. PTC high-current resistors of polymer material that has been rendered conductive are proposed in the EP-A-O 487 920: however, when thermoplastic polymer materials are used as thermistors, there are a few peculiarities that have to be taken into consideration when using such known PTC elements as current limiters.

— The Joulean heat required to heat the surface of the polymer layer to the critical temperature is proportional to the rise in temperature from the initial temperature up to the critical temperature. Specifically, this means that at lower initial temperatures, less adequate protective values are obtained than at high initial temperatures.

— Over the course of a long operational life and under the high contact pressure of the electrodes, especially at elevated temperatures, thermoplastic thermistors can become deformed and, thus, change their response characteristics.

— The thermistor effect and, thus, the rise in resistance when there is heating to temperatures above the critical temperature is sensitive in its dependence on the structure of the polymer. After a switching operation or a long service life without a load, i.e., an extended unenergized time, the rise in resistance can change substantially, so that the extent of the protective effect is not predictable in all cases.

These disadvantages are able to be avoided in the following examples.

In FIG. 2, 11 signifies a carbon-containing and/or carbon-black-containing layer, which is pressed between two metallic electrodes 12 and 13 and, together with these two electrodes, forms a high-current resistor 10. For example, the carbon- and/or carbon-black-containing layer 11 can have a thickness of about 1 mm and cover a surface of 10 $cm^2$. Specifically, the layer 11 consists of a porous material of individual carbon/carbon-black particles 101, whose pore-like cavities are filled with a binding agent 102.

Suitable as binding agents for the above purpose are polymer materials, such as polyethylene, polyester, but also waxes, grease, tars, pitches, and the like.

In particular, between the layer 11 and the boundary surfaces of the metal electrodes 12 and 13, a transition zone 15 is formed, whose structure is decisively responsible for the resistance characteristics. In detail A, the boundary surface and the transition zone are shown in the normal state, there being a small resistance in this case. In detail B, a short-circuit has occurred, there being a high resistance in this case.

In the case of the high-current resistor 10 depicted in FIG. 2 comprised of the layer 11, as well as of the electrodes 12 and 13, given increasing current in the transition zone 15, the contact resistance causes dissipation heat to be produced, which, when a suitable binding agent 102 is selected between the carbon-black or carbon particles 101, can split the latter into gaseous decomposition products 103. In the transition zone or the boundary layer, the decomposition products 103 produce a counterpressure to the pressure produced by the external contact pressure. By this means, the resultant contact pressure is reduced and the resistance rises.

To realize the latter effect in a defined and comprehensible manner, the resistor core must be produced in an appropriate fashion from the carbon-black- and/or carbon-containing layer and the binding agent. The manufacturing of the layer of carbon-black and/or of fine-grained carbon powder can initially take place with the addition of tar and pitch as a binding means and compressing of the layer at a low pressure. This layer is subsequently annealed at temperatures of up to 1000° C. to form an electrically conductive, porous layer. This annealed resistor core is then impregnated with wax or grease, which, at temperatures above 200° C., for example at 300° C., decompose into gaseous decomposition products to produce the pressure.

The carbon-black- and/or carbon-containing layer can, however, also be produced without annealing and subsequent impregnation by selecting a binding agent which itself at least partially decomposes above 200° C. Binding agents of this type are, e.g., polyethylene, polyester, or synthetic resins.

In an alternative development, the carbon-black- and/or carbon-containing layer 11 can also consist of matted carbon fibers having an added binding agent and, in some instances, also additional carbon-black or carbon particles. Carbon mats of this type are known per se for realizing conductive, porous, and very elastic layers. They can, in some instances, also be formed with a paper- or film-type consistency. To use these mats to assemble a variable resistor, it is necessary to also introduce carbon black or carbon, very finely and uniformly distributed, into the surfaces of the layers.

In the case of the described variable high-current resistor 10 comprising the carbon-black- and/or carbon-containing layer 11 and the electrodes 12 or 13, the surface of the metallic electrodes can be textured. Suitable texturing makes it possible to control current density. In particular, the carbon- and/or carbon-black-containing layer can also have complementary structures to allow transmission of forces.

Selectively controlling the force in the exemplary embodiment according to FIG. 2 not only brings about an external control of the resistor, but to a certain extent also a self-control, as is also already indicated under the state of the art. Thus, the force reduction can be carried out selectively and reproducibly. It must be considered here that, given a large flowing short-circuit current, the limiter properties develop because the power loss caused by the contact resistance heats the surface, and the impregnating material at the surface becomes gaseous. It is important for a following disconnection that the impregnating material be subsequently supplied from inside the carbon and/or carbon-black-containing layer and again wet the surface.

It is also possible to lessen the contact pressure by using magnetic forces. Given a properly connected high-current resistor, at high enough currents, a magnetic force can be generated by the short-circuit current itself, via a yoke-armature system:

In FIG. 3, an arrangement from FIG. 2 comprising a layer 11 and electrodes 12 and 13 is introduced into an insulating housing 20 provided with an electromagnet. Besides the insulating housing 20, 21 signifies an insulating plate to be placed on the high-current resistor 10, 22 a magnet armature, 23 a magnet yoke, 24 an air gap, 25 a spring-energy system, and 26 the corresponding conducting path: the high-current resistor 10, as well as the armature 22 and yoke 23 are introduced into the housing 20 so as to form a defined air gap that is adjustable by means of the spring elements 25 between the armature and the yoke, and so as to allow the spring energy to be transmitted to the two electrodes 12 and 13, as well as to the carbon- and/or carbon-black-containing layer 11. The conducting path 26 and the current through the high-current resistor 10 are electrically connected in series.

The electrical resistance can now be controlled by the pressure-dependent contact resistance of each of the two electrodes 12 and 13 to the electrically conductive layer 11 in that the spring energy is completely or partially compensated by the magnetic forces between the armature 22 and the yoke 23. In this manner, the contact resistance can be increased by up to three powers of ten, the electrical power loss rising heavily and, due to thermal decomposition of the binding agent 102 into decomposition products 103, other dynamic gas forces supporting the armature closing travel, as described in principle on the basis of FIG. 2, having an effect. As a result, the effective contact pressure is further reduced and the contact resistance is further increased.

What is especially advantageous about this arrangement is the capability of varying the air-gap width to adjust the operating current of the current-limiting device to defined short-circuit current values. A relatively sharp operating current is produced, which is a result of the $I^2$-dependent flow of energy of the magnetic force between the armature and yoke. In contrast to existing prior art, the current-limiting mechanism is not controlled here by the electric power loss (d(IxU)dt), but rather by the instantaneous current (I). Because of the current rise, the control passes automatically in this case above an adjustable operating current threshold. As a result, one achieves a rapid response while simultaneously avoiding faulty disconnections caused by longer lasting overcurrents.

As an alternative to the described combination of the counteracting force produced magnetically and by the gas pressure of the binding agent, to reduce the contact pressure, it is also possible for a system of this type to work only magnetically. For this type of pressure reduction, a binding agent must then be selected that does not decompose at the occurring temperatures. This can happen as the result of annealing at several 100° C., when tar and pitch are used as a binding agent.

Figure 6:
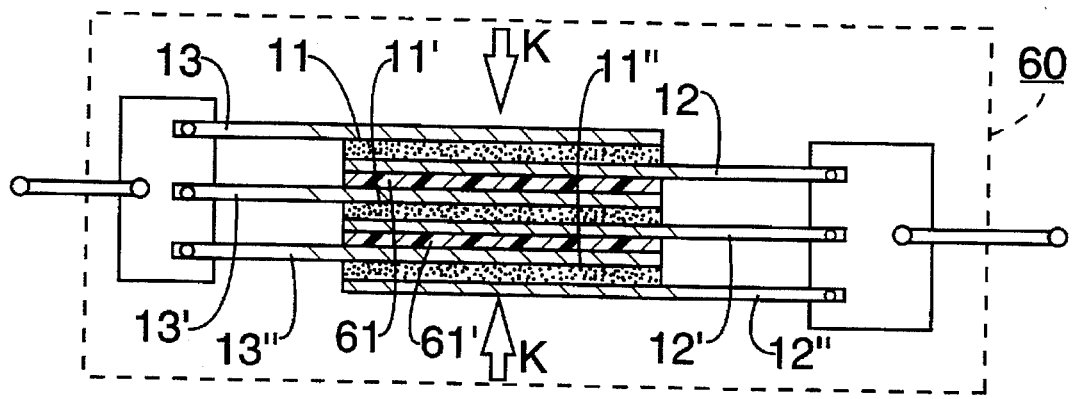
FIG. 6 depicts a high-current resistor consisting of a plurality stacked layers.
Figure 7:
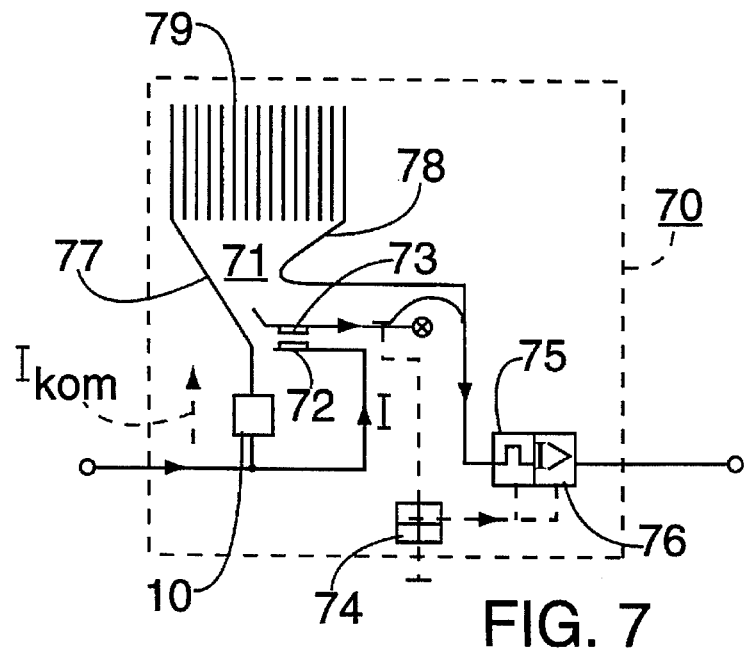
FIG. 7 depicts a high-current resistor integrated in a circuit-breaker.

In comparison to the prior art, FIG. 3 can illustrate the new principle of a limiter pursuant to the application. In FIGS. 6 and 7 of the EP-A-0 487 929, a contact pressure is supposedly produced by an armature-yoke system in that the point of contact is compressed with an increased force. In contrast, in the above described exemplary embodiment, the electromagnetic means are used to reduce the contact pressure and, thus, weaken the contact force, through which means an increase in resistance is effected.

In the examples described on the basis of FIG. 2 and 3, the current-limiting resistor functions automatically in response to the short-circuit current. The moment that the resistance begins to increase to the current-limiting value is given in the example according to FIG. 2 in that the surface temperature of the resistor core 11 has risen to the decomposition temperature of the impregnating material or of the binding agent. In the example according to FIG. 3, this moment is defined in that the magnetic force with its build-up $\sim I^2$ compensates or even overcompensates for an essential part of the compressive force.

Figure 4:
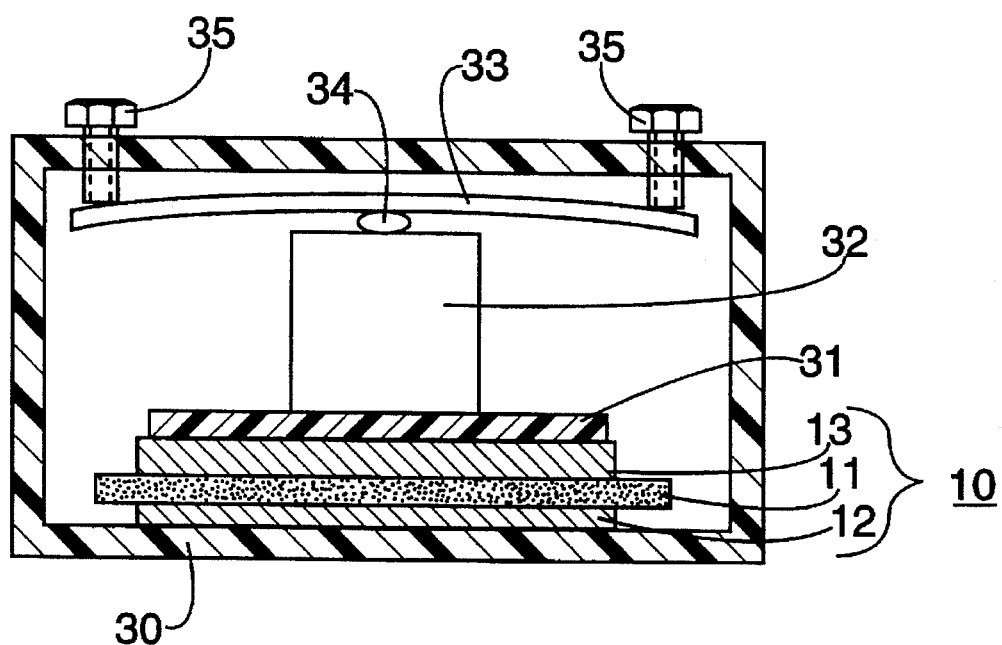
FIG. 4 depicts an arrangement controlled by means of a piezoelectric actuator as a third means for reducing force.

The instant that the resistance changes can be selectively influenced by an active electrical control. The use of piezo-electric actuating elements is suited, in particular, for this purpose: in FIG. 4, the variable high-current resistor 10 comprising the layer 11 and the electrodes 12 and 13 is introduced into an insulating housing 30. In FIG. 4, 31 denotes an insulating plate on the top electrode 13, 32 a piezoelectric actuating element as piezo-elongator, 33 a flat spring for generating contact force, with a corresponding bearing element 34 and adjusting screws 35. In a manner essentially similar to that of FIG. 3, the active elements rest on the high-current resistor 10; i.e., arranged above the insulating plate 31 is the piezo-elongator 32, which is braced via the flat spring 33 against the housing. The electric power supply is not shown in FIG. 4. The piezo-elongator 32 utilizes the so-called piezo-electric transverse effect, i.e., its length is shortened by about 0.5 to 1% when a voltage of about 1 kV is applied.

The resistance value of the high-current resistor is changed by triggering the piezo-elongator 32 with a high enough voltage. The contact force in the boundary layers or transition zones of the resistor element is reduced in proportion to the shortening of the piezo-elongator 32 in accordance with the spring constant of the spring element 33 being used. It can be determined by way of example that when the piezo-elongator 32 is shortened by 50 µm, given a suitable spring constant, the contact force decreases by about 1500N to 500N.

Figure 5:
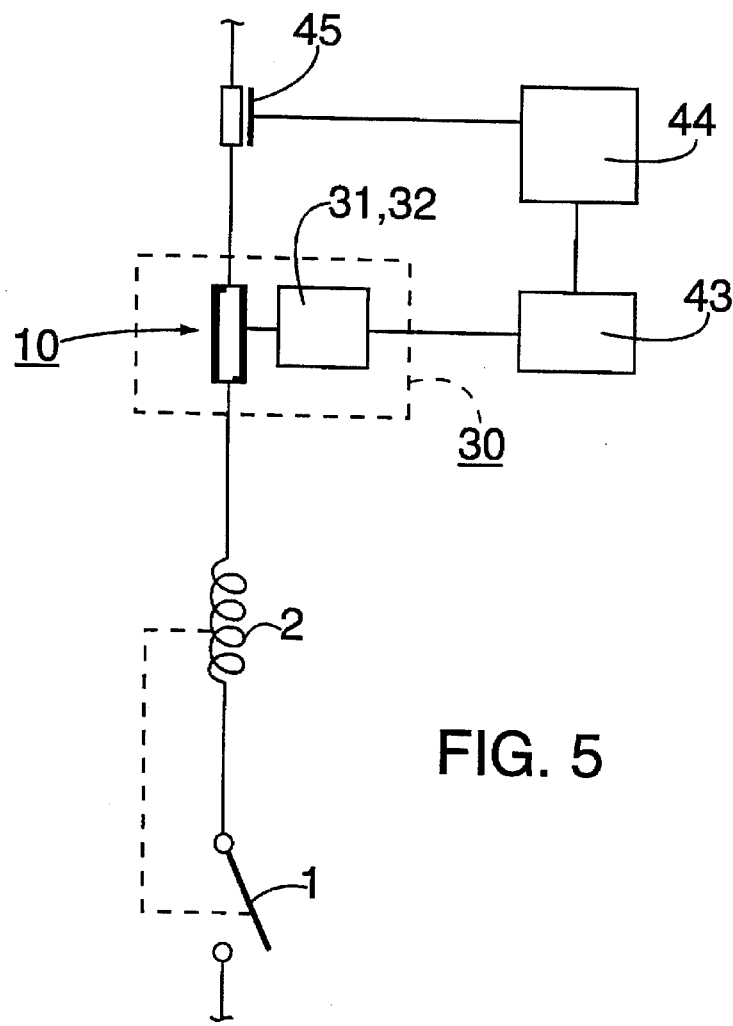
FIG. 5 depicts the circuit arrangement necessary to activate the arrangement according to FIG. 4.

The piezoelectrically actuated high-current resistor in accordance with FIG. 4 is used in conjunction with a current sensor 45, an evaluation and trigger module 44, and a high-voltage pulse unit 43. The corresponding circuit arrangement is revealed in FIG. 5. The instantaneous current in the electric circuit is measured by the current sensor 45, and the instantaneous current is compared, e.g., to a preset current threshold in the evaluation and trigger module 44. If the instantaneous current exceeds the preset current threshold, a trigger signal is generated, which in the high-voltage pulse unit 43 generates a high-voltage pulse of several ms for the piezo-elongator 32 in accordance with FIG. 4. Shortening the piezo-elongator 32 reduces the contact force in the high-current resistor, through which means its resistance goes up by up to three powers of ten. Thus, the current in the electric circuit is limited.

In the place of the arrangement of the piezo-elongator in accordance with FIG. 4 with a flat spring, other force-transmission systems with other spring arrangements having an average spring constant can also be assembled. In particular, arrangements with piezo-elongators can be so conceived that their center of mass remains more or less at rest during the pulse operation, so that the force-transmission elements being used do not receive any force counteracting the spring energy during the pulse duration. This counteracting force can, rather, be taken up by special plastic intermediate adapters, which in the case of a sudden stress react rigidly, but in the case of sustained stress exhibit flow properties. Thus, an automatic compensating device can be realized, which in the case of material erosion on the actual high-current resistor 10, again establishes a friction-locked positioning of the piezo-elongator 32.

The above-described variable high-current resistors, which are controlled according to different principles, are used in particular in conjunction with a circuit-breaker. For this purpose, essentially a circuit arrangement in accordance with FIG. 1b is realized, in which a circuit breaker that is tripped by the short-circuit current and, in the end, interrupts the electric circuit is electrically connected in series with the variable high-current resistor. The increase in short-circuit current is quickly limited by the rise in resistance of the variable high-current resistor, and the amplitude of the breakdown current is limited to values that are not critical for the series-connected circuit-breaker.

To avoid a thermal overloading of the variable high-current resistor, a second current circuit with defined resistance or defined response voltage can be connected in parallel to unload current. This is especially useful when there is inductance in the circuit arrangement, whose stored energy could damage the high-current resistor in the event of a short-circuit.

It can be beneficial to connect a plurality of variable high-current resistors as current-limiting elements, so when all series-connected elements respond, a voltage of several 1000 V is reached. Thus, a current limitation can also take place in the mid-voltage range of above 1000 V.

In one special arrangement, the electrically series-connected protective elements can be integrated in a housing of insulating material, e.g. of ceramic, for purpose of electrical insulation and thermal conduction, the elements being able to be surrounded by an insulating fluid, such as oil, which thermally dissipates the electrical power loss to the housing wall. The outer electrodes 12 and 13, the carbon-black- and/or carbon-containing layers 11, and the intermediate electrodes are mechanically connected in series in this case and compressed by means of a contact force with a predefined pressure. To improve the dissipation of heat of the intermediate electrodes to the insulating and cooling fluid, partial surfaces of the intermediate electrodes can be in contact with the fluid. To protect the protective elements from overloading in the event of a short-circuit, a second current circuit with a resistor is connected in parallel. This resistor can be situated outside of the insulating housing; it can, however, also be integrated in the insulating housing so as to allow each of the intermediate electrodes to be in electrical contact with the parallel resistor, designed e.g. as a resistance band, the points of contact being distributed uniformly over the length of the resistor band. It is thus, achieved that when one of the protective elements responds, the electric current commutates to the parallel-connected resistor section, and the still continuing current flow reliably brings all protective elements to operate.

Furthermore, FIG. 6 depicts an electric parallel connection of a plurality of protective elements to be used at higher nominal currents without having to increase the contact force required for structural reasons. Specifically, 10, 10', 10" denote individual high-current resistors having carbon- and/or carbon-black-containing layers 11, 11', 11", and associated metal electrodes 12, 12', and 12", as well as 13, 13', 13", which are mechanically stacked on one another with the insertion of insulating plates 61 or 61' in-between so as to produce compact units, each having an external connection. For a larger number of parallel-connected protective elements, the insulating intermediate layers 61, 61' present in FIG. 6 can likewise be replaced by carbon-black-containing layers, corresponding to the layers 11, 11'.

As a result of the electrical parallel connection of the circuit elements, when the current-carrying cross-sections are enlarged, the usually required relatively large contact pressure, which lies in the order of magnitude of 1 to 2 kN, does not have to be increased proportionally. Thus, in this case, the protective elements are electrically connected in parallel and, for the contact pressure, mechanically in series. It is, thus, also avoided that the contact pressure that is reinforced by the structural design, for example by a plastic housing, leads to a mechanical overloading, or that the design has to be realized with extra outlay for material and volume.

In particular, when additional insulating houses are used, it can be practical to effect a gas-tight encapsulation and to use an inert gas, e.g. hydrogen or nitrogen, as a filling. The gas pressure can amount in this case to one or more atmospheric pressures. Because of the gas filling, a parameter is made available with which the formation of electric arcs can be controlled. As a result, explosion protection is also guaranteed.

A variable high-current resistor according to the invention is usually connected in series with a circuit element. In place of the series connection with a circuit-breaker, the described variable resistor can also be directly integrated in a circuit breaker, as is shown on the basis of FIG. 7.

In FIG. 7, a current-limiting circuit-breaker 71 contains at least two contacts 72 and 73, of at least one is designed to be movable and capable of being opened and closed by a breaker mechanism 74, which can be tripped by a thermal and/or magnetic trip element 75 or 76. An electric-arc slide rail 77 and 78 is associated with each contact 72 and 73. After firing of arc base points, the arc travels on the slide rails into an arcing chamber having arc splitters 79, where an arc-drop voltage that is high enough for current limiting and arc extinction is built up. At very high short-circuit currents, for example IK=50 to 100 kA, the rise in arc-drop voltage no longer suffices, however, to limit the cut-off current of the circuit-breaker to uncritical values and to avoid damage to or destruction of the switching device.

For the case of a very high short-circuit current, the circuit-breaker 71 now has a high-current resistor, as described previously. This current-limiting element is not connected, however, into the main current circuit, but rather, together with the supply lead to the one electric-arc slide rail 77, forms a shunt current circuit, which is then current-carrying when the arc is struck as the result of firing of a base point on this slide rail. In a comparable circuit arrangement, instead of being connected into the supply lead of the first electric-arc slide rail 77, the variable high-current resistor 10 can be connected into the supply lead of the second electric-arc slide rail 78.

The special advantage of this arrangement of the variable high-current resistor 10 is found in that under all nominal operating conditions, such as starting or warm-up currents or overcurrents due to an elevated ambient temperature, the electric circuit remains unaffected and, in particular, a faulty disconnection is avoided by the current-limiting element. As a secondary effect, aging processes, such as material embrittlement due to heating, thermal overloading of functionally important molded parts and/or the like, as well as electric losses on the current-limiting element are avoided.

Therefore, the dimensional design of the current-limiting element is no longer orientated to the nominal current range of the circuit breaker to be protected, but rather to conditions for a reliable arc commutation to the slide rails and a rapid increase in resistance.

Alternatively to interconnecting circuit-breakers, the variable high-current resistor according to the invention can also be combined with power semiconductors as circuit elements. In this case, by properly dimensioning the high-current resistor, the cut-off current and the Joulean heat pulse in the event of a short-circuit can be limited to the extent that the power semiconductor is not damaged. The high-current resistor then replaces a semiconductor fuse.

The variable high-current resistor in accordance with the invention can also be connected in conjunction with contactors or vacuum contactors as circuit elements. Here, again, by properly dimensioning the high-current resistor, care can be taken to avoid welding the contacts of the contactor. In this manner, a weld-free fuse protection for the contactor is guaranteed.

The sensitivity of the above-described variable high-current resistor is able to be intensified still further in that in nominal current operation, only a partial current flows across the high-current resistor, while the other partial current is carried via a parallel sub-circuit. The parallel sub-circuit can be connected or disconnected by means of suitable circuit components. The latter becomes clear on the basis of FIG. 8.

Figure 8:
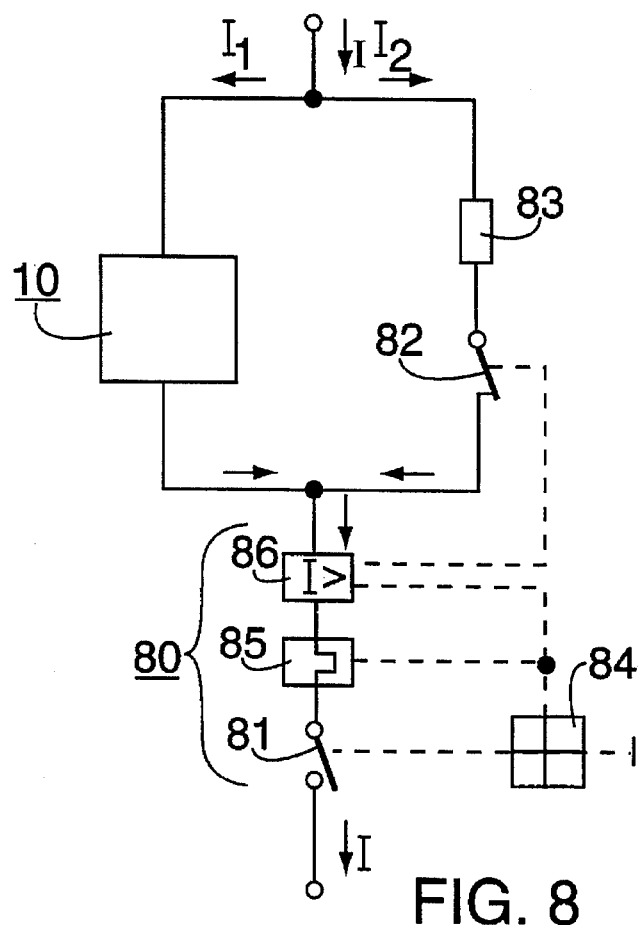
FIG. 8 depicts a circuit modification of the high-current resistor for purposes of increasing sensitivity.

In FIG. 8, a circuit-breaker contact 80—corresponding to circuit-breaker 1 in FIG. 1a—is depicted with a breaker mechanism 84 and thermal and magnetic trip elements 85 and 86, to which a conducting path of two parallel sub-circuits with partial currents $I_1$ and $I_2$ are electrically connected in series. In this case, the one parallel sub-circuit contains the variable high-current resistor 10, and the other parallel sub-circuit contains a commutation contact 82, to which a constant resistor 83 is connected in series. The resistance value of the constant resistor 83 can be rated to correspond more or less to the low-resistance value of the variable high-current resistor 10, so that the current I is divided into more or less the same size partial currents $I_1$ and $I_2$ of the parallel sub-circuits. It is advantageous in this case that the electrical power loss of the parallel conducting paths is more or less half the size of that of a single conducting path having a variable high-current resistor 10.

In the case of a high enough overcurrent, the magnetic tripping mechanism 86 of the circuit-breaker 80 now responds, the breaker mechanism 84 is released and, given sufficient magnetic excitation, the switching contacts 81 and 82 open. As a result of the arc-drop voltage of the circuit-breaker, the current 12 is commutated to the still low-voltage parallel circuit. By increasing the current by, e.g., the factor 2, the power loss ($\sim I^2$) in the variable high-current resistor 10 is increased by the factor 4, which leads to a rapid temperature increase at the contact surface of the resistor element and, as the result of decomposition of the binding agent, reduces the effective contact force caused by compressive forces.

The splitting of the current of the total current I into the partial currents $I_1$ and $I_2$ in the case of nominal current operation, as well as the current displacement of the entire current to the variable high-current resistor 10 in the event of a short-circuit makes it possible to have a separate rating for the nominal operating properties and for the short-circuit properties of the indicated circuit arrangement. In this manner, the current-limiting device can be adjusted to be insensitive in nominal operation and sensitive in the event of a short-circuit.

We claim:

1. A variable high-current resistor, especially for use as a protective element in power switching applications, comprising:
   a) a first electrode of a highly conductive material;
   b) a second electrode of a highly conductive material;
   c) at least one resistive layer arranged between the first and second electrodes and including a resistive material comprised of at least one of a carbon and a carbon-black, the resistive layer having a transition zone to the second electrode, which receives a contact pressure;
   d) means for selectively influencing the contact pressure, wherein the resistive layer is pressed by a contact pressure with a preset first value against the first and second electrical electrodes to adjust a low-resistance state of the resistor, and in the event of a short-circuit, the contact pressure is opposed by an opposing pressure so as to produce a resultant pressure which is reducible in a short enough time to a second value at which the resistance in the transition zone is increased by at least two orders of magnitude, the opposing pressure developing between the resistive layer and the second electrode primarily as the result of thermal decomposition of the binding agent into gaseous decomposition products, in that a temperature of the binding agent in the transition zone of the resistive layer to the second electrode is increased by the electric power loss up to the decomposition temperature.

2. The variable high-current resistor according to claim 1, wherein for a protective element design, in the event of a short-circuit when a specifiable current threshold is exceeded, the resistance in the transition zone rises, for instance, 100 to 1000 times and, thus, reliably limits the short-circuit current to harmless values within a time that is short in comparison to the system power-supply period.

3. The variable high-current resistor according to claim 1, further comprising two resistive layers, which bound the transition zone.

4. The variable high-current resistor according to claim 1, further comprising at least one metallic electrode bounding the transition zone with the resistive layer.

5. The variable high-current resistor according to claim 4, wherein the metallic electrode further comprises a textured surface.

6. The variable high-current resistor according to claim 5, wherein the resistive layer has a complementary textured surface through which forces are transmitted.

7. The variable high-current resistor according to claim 1, wherein the resistive layer has a thickness of at least 100 µm, preferably 1 mm, and is compressed between two metallic electrodes.

8. The variable high-current resistor according to claim 7, wherein the resistive layer is formed, at least partially by carbon fibers with a paper-, film-, or mat-type consistency.

9. The variable high-current resistor according to claim 1, wherein the resistive layer comprises binding agents.

10. The variable high-current resistor according to claim 9, wherein the binding agents consist of polymer materials, which include one of the following, polyethylene, polyester, waxes, grease, tars or pitches.

11. The variable high-current resistor according to claim 9, wherein the resistive layer includes tar and pitch as a binding means, the resistive layer being compressed at a low pressure and annealed at temperatures of up to 1000° C., the resistive layer being electrically conductive and porous.

12. The variable high-current resistor according to claim 9, wherein a binding agent is used, which above specified temperatures, decomposes into decomposition products.

13. The variable high-current resistor according to claim 1, wherein in the transition zone, the electric power loss splits the binding agent between particles of the resistive layer into gaseous decomposition products and the decomposition gases produce a compressive force which opposes the contact pressure.

14. The variable high-current resistor according to claim 1, wherein to produce the resistive layer, the annealed compact is impregnated with wax or grease, which, at temperatures above 200° C. decompose into gaseous decomposition products to produce the pressure.

15. The variable high-current resistor according to claim 1, further comprising an electromagnet for reducing the resultant pressure in conformance with the flowing current.

16. The variable high-current resistor according to claim 15, wherein the electromagnet further comprises a yoke and an armature, wherein an electromagnetic force is produced between the yoke and the armature of the electromagnet, which is excited by the short-circuit current itself.

17. The variable high-current resistor according to claim 1, including electrical actuators which produce large forces in the case of small paths for reducing the resultant pressure.

18. The variable high-current resistor according to claim 17, further comprising a separate control circuit, which triggers the piezoelectric actuating element, when an adjustable current threshold is exceeded, the force between the transition zone is reduced by the actuating element designed as an elongator so that the resistor becomes highly resistive.

19. The variable high-current resistor according to claim 1, further comprising an insulating housing with inert gas which encapsulates the resistor.

20. The variable high-current resistor according to claim 1, further comprising a layered structure, a plurality of resistive layers being mechanically connected in series, but electrically coupled in parallel.

21. The variable high-current resistor according to claim 1, further comprising means for commutating a partial current from a parallel sub-circuit to the high-current resistor to increase the short-circuit responsivity.

22. A circuit having a variable high-current resistor according to claim 1, further comprising a series connection of a plurality of variable high-current resistors as protective elements for limiting current, so that when all series-connected elements respond, a voltage of several 1000 V is reached, through which means the current limitation also takes place in the mid-voltage range of above 1000 V.

23. The circuit according to claim 22, further comprising several high-current resistors arranged as protective elements in a shared insulating housing having insulating and cooling fluid, and that an outer parallel resistor is provided.

24. The circuit according to claim 23, further comprising several high-current resistors arranged as protective elements in a shared insulating housing having insulating and cooling fluid, and parallel resistors having points of contact to the individual protective elements.

25. A circuit making use of a variable high-current resistor according to claim 1, further comprising a circuit-breaker as a circuit element, wherein the high-current resistor and the circuit-breaker are integrated in a shared housing.

26. The circuit according to claim 25, wherein the variable high-current resistor is arranged in a secondary current circuit leading to the point of contact of the circuit-breaker.

27. The circuit according to claim 26, wherein the variable high-current resistor is first traversed by the flow of current in the event of a short-circuit when the current contacts are opened and an electric arc is commutated to at least one of the electric-arc slide rails.

28. A circuit making use of a controllable high-current resistor according to claim 1, further comprising a power semiconductor as a circuit element, wherein by properly dimensioning the high-current resistor, the cut-off current and the Joulean heat pulse in the event of a short-circuit are limited so that the power semiconductor is not damaged.

29. A circuit making use of a controllable high-current resistor according to claim 1, further comprising a contactor as a circuit element, wherein by properly dimensioning the high-current resistor, the cut-off current and the Joulean heat pulse in the event of a short-circuit are limited so that a welding of the contacts of the contactor is avoided.

30. A circuit arrangement making use of a variable high-current resistor according to claim 1, further comprising a vacuum contactor as a circuit element, wherein by properly dimensioning the high-current resistor the vacuum contactor is not damaged by overloading.

* * * * *